United States Patent [19]
Vawter

[11] Patent Number: 5,989,483
[45] Date of Patent: Nov. 23, 1999

[54] METHOD FOR MANUFACTURING POWDER METALLURGICAL TOOLING

[76] Inventor: Paul D. Vawter, 668 W. Magill Ave., Fresno, Calif. 93704

[21] Appl. No.: 09/005,304

[22] Filed: Jan. 9, 1998

Related U.S. Application Data

[62] Division of application No. 08/829,806, Apr. 21, 1997, which is a continuation of application No. 08/558,731, Nov. 16, 1995, Pat. No. 5,623,727.

[51] Int. Cl.⁶ .................................. B28B 1/08; B28B 5/00
[52] U.S. Cl. ............................. 264/603; 264/682; 264/71
[58] Field of Search ................................. 264/71, 86, 434, 264/603, 682

[56] References Cited

U.S. PATENT DOCUMENTS

| | | |
|---|---|---|
| 2,897,572 | 8/1959 | Hansen . |
| 3,665,151 | 5/1972 | Piper . |
| 3,853,566 | 12/1974 | Prochazka ................................. 106/44 |
| 4,014,704 | 3/1977 | Miller .................................... 105/38.22 |
| 4,041,123 | 8/1977 | Lange . |
| 4,389,362 | 6/1983 | Larsson . |
| 4,456,578 | 6/1984 | Ward . |
| 4,501,718 | 2/1985 | Bradt . |
| 4,539,175 | 9/1985 | Lichti . |
| 4,547,337 | 10/1985 | Rozmus . |
| 4,564,601 | 1/1986 | Kriegesmann et al. ................... 501/88 |
| 4,747,999 | 5/1988 | Hasselstrom . |
| 4,756,752 | 7/1988 | Barnard . |
| 5,028,362 | 7/1991 | Janney et al. .............................. 264/25 |
| 5,093,076 | 3/1992 | Young . |
| 5,134,260 | 7/1992 | Piehler . |
| 5,178,691 | 1/1993 | Yamashita . |
| 5,227,235 | 7/1993 | Moro . |
| 5,246,638 | 9/1993 | Goldberger . |
| 5,346,667 | 9/1994 | Kamitjuma . |
| 5,348,800 | 9/1994 | Moro . |
| 5,368,086 | 11/1994 | Kloskowski ............................... 164/33 |
| 5,380,482 | 1/1995 | Maginnis . |
| 5,405,570 | 4/1995 | Fuma . |
| 5,429,781 | 7/1995 | Montgomery ............................. 264/63 |
| 5,521,129 | 5/1996 | Campos-Loriz et al. ................. 501/89 |
| 5,738,819 | 4/1998 | Feagin .................................... 264/635 |

FOREIGN PATENT DOCUMENTS 2140825  12/1984  United Kingdom .

*Primary Examiner*—Ngoclan Mai
*Attorney, Agent, or Firm*—Wall Marjama Bilinski & Burr

[57] ABSTRACT

A method of forming a refractory die, and a method for forming a metal article using a refractory die. The refractory die is formed of a ceramic material by casting a slurry containing particles of the ceramic material onto a mold. Then the mold is vibrated while excess liquid medium from the slurry is simultaneously removed, whereby ceramic particles continue to flow into surface details of the mold. The present method of forming a refractory die minimizes drying and firing shrinkage, and even adjusts for drying and firing shrinkage by inclusion of kyanite in the refractory die. According to the method of forming a metal article, a particulate material containing powdered metal is compressed on a refractory die at an elevated temperature and pressure. The consolidated particulate material is differentially cooled, wherein a first, low mass portion contacting the refractory die is cooled more quickly than an opposing, high mass portion of the consolidated body. According to this method, hot tears are prevented.

18 Claims, 1 Drawing Sheet

METHOD FOR MANUFACTURING POWDER METALLURGICAL TOOLING

RELATED APPLICATIONS

This is a division of application Ser. No. 08/829,806 filed Apr. 21, 1997, which in turn is a continuing application of Ser. No. 08/558,731 Nov. 16, 1995, now U.S. Pat. No. 5,623,727. Both prior applications are hereby incorporated herein by reference.

FIELD OF THE INVENTION

The present invention relates to a method of forming a refractory die, and a method of manufacturing an article by powder metallurgy utilizing a refractory die, wherein the article is comprised of a shaped consolidated particulate material.

BACKGROUND OF THE INVENTION

Processes for producing consolidated metallurgical articles from metal powders are well known. For example, U.S. Pat. No. 4,747,999 to Hasselström describes a method of producing a consolidated powder metallurgical article using a particulate pressure medium which is preheated in a special container, in a "fluidized" bed. The bed is then heated to a forging temperature and transferred to an outer mold. Pressure is then applied to the pressure medium by means of a pressure tool. This method disadvantageously requires a pressure medium, a fluidized bed, and complex equipment to preheat the pressure medium and to transfer its contents to an outer mold.

Further, the method of the '999 patent does not provide a means to control shrinkage or physical dimensions in the ceramic mold and/or consolidated article, but rather, requires a shrinkage compensated model. This process does not allow existing parts, dies, molds and patterns with finished dimensions to be candidates for the original model, but rather, requires an oversized model, which increases the number of steps required and labor costs.

Further, the method of the '999 patent suffers from interparticle friction of the pressure medium. Interparticle friction is described in UK Patent 2140825A, in which a method is described to reduce such friction and provide uniform pressure. Interparticle friction requires increased pressure or heat to consolidate the powder metal article, requiring large equipment and energy costs. Further, the method of the '999 patent requires crushing of the ceramic mold to remove finished articles, and does not allow the ceramic mold material to be removed from internal passageways or cavities, thereby severely limiting part configuration possibilities.

Other prior art techniques use heat and pressure to increase further the density of a pre-consolidated powder metal article, requiring metal dies machined to desired part geometry. Such a die is loaded with metal powder and compressed in the range of 20,000–100,000 psi at room temperature. The article is then ejected from the die and transferred to a furnace and sintered to increase density and particle bonding. The article is then transferred to a forging die and is surrounded by a particulate pressure medium, wherein heat and applied pressure transferred through the medium further consolidates the metal article to high density.

Such prior art techniques require numerous steps and equipment to produce a powder metal article having complex shape, high density and dimensional accuracy. Cold compaction pressures of 20,000–100,000 psi, followed by sintering requires expensive powder compacting equipment, metal tooling and a sintering furnace to produce a pre-consolidated metal part. The additional steps of placing a pressure medium in a forging die, positioning the metal article upon this medium, covering the metal article with additional medium, and heating the pressure medium and metal article to a forging temperature to densify the metal article increases labor, material and energy costs.

An additional drawback of requiring a pressure medium is interparticle friction, as noted above, which can additionally cause distortion and loss of dimensional accuracy. See U.S. Pat. Nos. 4,539,175 and 4,501,718. The loss of dimensional accuracy requires secondary machining of the article to its final dimensions which increases costs. Further, the pressure medium has additional disadvantages of increasing surface area and volume, requiring larger forging dies, and requiring additional pressure and/or heat. Accordingly, use of a pressure medium requires larger equipment to consolidate a metal article, resulting in an increase in equipment, energy and labor costs.

U.S. Pat. No. 4,041,123 discloses a method of producing a powder article which requires producing a pre-consolidated article by mixing a ceramic powder and water to form a slurry which is casted into a porous mold. This pre-formed body has a void content of 30–60%. A pressure medium, heat and applied pressure are used to consolidate further the article to higher density. This method has several disadvantages. Slip casting requires a porous mold to be fabricated from an original article or rubber mold and requires a water content of 40–70% (leaving a particulate density of only 30–60% by weight). Due to the high water content, tremendous shrinkage results both when drying and in final consolidation. In addition, the density of a slip cast part varies, caused by larger, heavier powder particles settling at the bottom of the mold causing density gradients and resulting in non-uniform shrinkage. This distortion is further increased by the use of a particulate pressure medium. Interparticle friction of a pressure medium causes non-uniform pressure on the ceramic article being consolidated, resulting in distortion or loss of dimensional accuracy as noted in U.S. Pat. Nos. 4,501,718 and 4,539,175. This distortion or loss of dimensional accuracy increases the need for machining the article to its final dimensions and increases costs. The pressure medium increases the surface area or volume, thereby requiring higher pressure and/or heat for consolidation. Larger dies are necessary to accommodate the pressure medium resulting in increased machine size, labor and energy costs.

Other prior art techniques are shown in U.S. Pat. No. 4,041,123, which teaches a casted ceramic article that is made more dense by a pressure medium that requires heat and applied pressure to further increase density to the casted ceramic article. This technique can not produce a complex metal article in situ, but uses the heat and pressure operation only to make a further dense article.

The prior art method shown in U.S. Pat. No. 4,547,337 discloses a method to consolidate a powder in which the powder to be consolidated is placed in a hermetically sealed cylindrical container which is evacuated. The container is embedded in a glass material that becomes viscous at a desired temperature. Applied pressure deforms the glass pressure medium in turn applying pressure to the inner cylindrical container containing a powder which is then consolidated. It is mentioned that if a more intricately shaped article is required, the cylindrical inner container may be eliminated, and other materials such as elastomers could be used to produce an intricately shaped rubber mold to encapsulate the powder metal. The mold transfers its shape to the powder metal under pressure to produce an intricately shaped article. This method of manufacturing requires a pressure medium that collapses, deforms or becomes viscous under heat and/or pressure to consolidate a powder metal. The nature of a pressure medium which becomes viscous or deforms under heat and/or pressure would transfer this deformation to the loose powder metal during consolidation, causing distortion and loss of dimensional accuracy, thus requiring machining of the article to its final dimensions which increases costs. Additional steps of manufacturing a cylindrical container and then requiring a glass material to be casted around this container also increases costs.

The use of the pressure medium step has the additional disadvantage of requiring a larger forging die to contain this medium, and, in turn, increases surface area or volume which requires higher heat and/or pressure to consolidate the metal powder. It also increases machine size, energy and labor costs. This prior art mentions the use of the elastomer tooling to apply pressure to the powder metal. The method has the disadvantage of deforming the loose metal powder at room temperature and would require additional steps to place the article in a pressure medium using heat and applied pressure for further consolidation to produce a high density article. The article experiences further deformation by this additional consolidation step requiring secondary machining to its final dimensions which would increase costs.

A further process is shown in U.S. Pat. No. 4,389,362 which discloses a process for making a metal billet by encapsulating metal powder in a metal capsule, or as it is more commonly known a "metal can," and placing a pressure transmitting medium that becomes viscous at consolidation temperature between a first can and a second can, which must be fabricated to encapsulate this pressure medium. A second pressure medium is required to compress the second can. Heat and an applied pressure medium makes the second can more dense. The viscous pressure medium in turn makes the first can more dense, which contains the powder metal. This is a method that requires numerous troublesome steps to consolidate a metal powder. First, a metal can for housing the metal powder must be fabricated, which is usually done by sheet metal equipment. This first can requires embedding in an outer pressure medium, requiring another can to be manufactured and another pressure medium. This method requires two "cans" and two different pressure mediums, such as glass and talc. This method cannot produce a complex shaped article in situ but requires multiple manufacturing steps of producing metal cans to contain either a pressure medium or metal powder. The pressure medium that deforms or becomes viscous transfers that shape or deformity to the loose metal powder being consolidated. The additional outer pressure medium suffers from interparticle friction which causes uneven pressure and causes additional distortion which is disclosed in U.S. Pat. Nos. 4,501,718 and 4,539,175. The distortion causes loss of dimensional accuracy and requires machining of the article to its final dimensions which increases the steps and costs. These two pressure mediums increase volume and surface area which require larger dies, higher heat and/or pressure resulting in larger machinery requirements and higher energy and labor costs.

SUMMARY OF INVENTION

The present invention has been developed to overcome the drawbacks associated with the prior art methods described above.

According to a first aspect of the present invention, a method is provided for forming a refractory die which is used to form a consolidated powder metallurgical body. The method calls for forming a slurry comprising ceramic particles in a liquid medium, casting the slurry onto a mold having a molding surface containing surface details, the slurry having a liquid medium content sufficient to permit flow of ceramic particles into the surface details of the mold, simultaneously vibrating the mold and removing excess liquid medium from the slurry, wherein the ceramic particles continue to flow into the surface details of the mold, drying the slurry to form a dried green body, and firing the dried green body.

According to the first aspect of the present invention, a refractory die is provided with very low shrinkage and which accurately replicates the details of the mold. In addition, the refractory die may include a material such as kyanite which is effective to produce a refractory mold that maintains its original size even after firing. Kyanite has a unique property in which kyanite particles permanently expand upon heating past a minimum firing temperature.

According to the second aspect of the present invention, a method of forming a metallic article is provided, wherein a particulate material, including powdered metal, is placed in a forging die containing a refractory die, the refractory die having surface details, heating the forging die and the particulate materials therein at a consolidation temperature, pressing the particulate materials in the forging die to form a dense body having a surface portion that replicates the surface details of the refractory die, and differentially cooling the dense body. Particularly, a first portion of the dense body that contacts the refractory die is cooled more quickly than a second portion of the refractory die that is remote from the first portion, whereby hot tears are prevented in the first portion. After differentially cooling the dense body, the refractory die is removed therefrom.

According to the second aspect of the present invention, a first portion, a relatively low mass portion, is cooled more quickly than the second portion, the remaining relatively high mass portion of the dense body. During differential cooling, the high mass second portion continues to feed material to the low mass second portion as it cools, thereby preventing hot tears in the dense body.

Preferably, first and second opposing rams are utilized to press the particulate materials, the refractory die being placed on one of the two rams. Cooling of the dense body after pressing may be executed by utilizing water-cooled rams. Pressure may be applied during both heating and cooling cycles. Additionally, insulative spacers may be placed between the ram opposing the second portion of the dense body, so as to prevent partial heat flow from the second portion of the dense body to the ram, thereby providing differential cooling.

The metal powder of the consolidated dense body may include metal alloys as well as unalloyed metals. Further, non-metallic materials, such as plastic, ceramic, carbides and other hard agents may be incorporated into the metal powder. Further, mixtures of pure metal and/or alloy powders and/or non-metallic powders may be utilized. In addition, the particulate materials may take the form of fibers, such as metal fibers, ceramic fibers or carbon fibers.

DETAILED DESCRIPTION OF THE PREFERRED EMBODIMENTS

Figure 1:
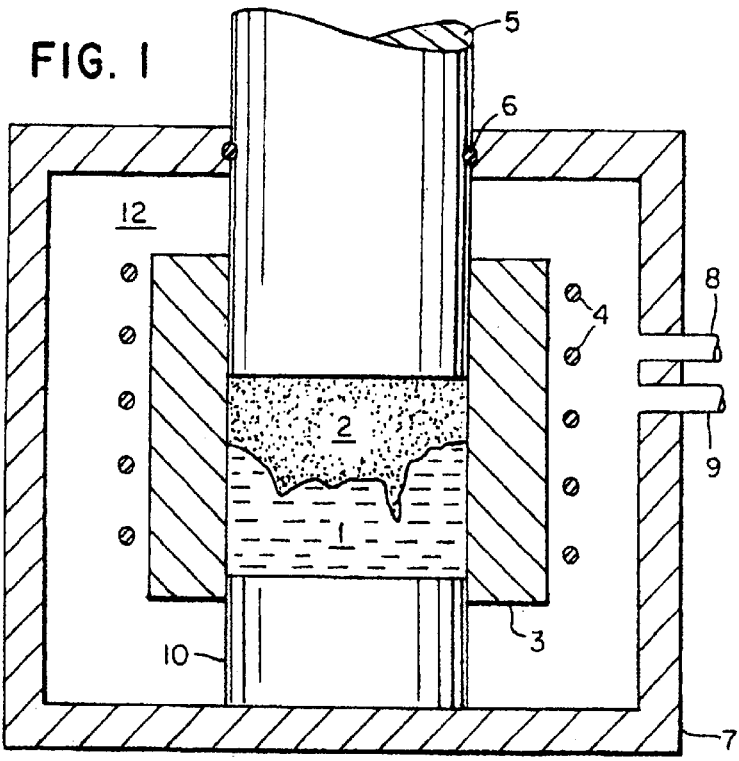
FIG. 1 schematically illustrates the manufacturing process and equipment according to the present invention.
Figure 2:
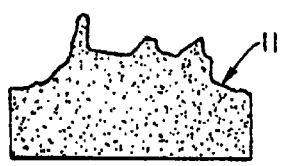
FIG. 2 shows a consolidated article which has been produced according to the invention.

In FIG. 1, a refractory die 1 is designated with the numeral 1. It is manufactured by means of replicating an original model using coarse and fine ceramic refractory powders, liquids and binders to produce an article by casting or other methods. The refractory die 1 is positioned in a forging die 3 and is covered with the particulate materials 2. The particulate materials comprise metal powder, such as H13 tool steel powder. A movable upper ram 5 provides at least one source of axial pressure upward and downward in the forging die 3. The movable upper ram 5 passes through a sealed inlet 6 of a furnace 7. The interior of the furnace 12 can be heated by means of interior heating elements 4. The interior of the furnace 12 can also be subjected to a gas flow through connections 8, 9. The connections 8, 9 are utilized for evacuating the air of the interior furnace 12 with a protective gas such as nitrogen and/or hydrogen, before the particulate materials are consolidated. During consolidation, the movable upper ram 5 is pressed downward to provide axial pressure on the particulate materials, whereby the particulate materials are compressed to a desired density and to replicate the surface of the refractory die 1. After the consolidated article 11 is formed, the temperature of the furnace 7 is lowered and the refractory die 1 and the consolidated article 11 are removed. The refractory die 1 is removed by mechanical methods (e.g. quenching, hammering) or chemical leaching (e.g., via an alkali metal) to recover the consolidated article 11 as shown in FIG. 2. A 60/40 mix of molten potassium hydroxide/sodium hydroxide has been found to be an effective leaching agent.

The refractory die may be attached to the upper ram or movable ram. At consolidation conditions (i.e., 2100–2300° F. and 3,000–10,000 psi), the refractory die may be plunged into the particulate materials and extracted before the particulate materials cools, eliminating the steps of removing the refractory die by mechanical or chemical leaching.

Figure 3:
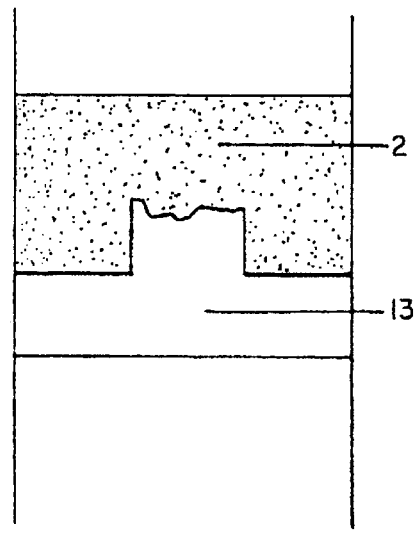
FIG. 3 is a cross-sectional view of the particulate materials cooling and solidifying around a core of a refractory die.

During the consolidation step, the particulate materials 2 solidify and shrink tight around the refractory core 13 as shown in FIG. 3. To reduce shrinkage, and, particularly, prevent hot tears in the consolidated particulate material in low mass portions thereof (e.g., finely detailed portions along the refractory die), the consolidated material is differentially cooled while pressing. Particularly, the cooling of the fine, low mass portion of the consolidated material along the die is executed more quickly than the remaining high mass portion. For example, water cooled upper and lower rams may be used, wherein the ram carrying the refractory die (here, the lower ram) is cooled to a temperature lower than the upper ram. Alternatively, each ram may be cooled using the same temperature water, but insulative disks or insulative powder may be placed between the upper ram and the consolidated body to permit relatively less heat flow to the upper ram. In either case, the particulate materials 2 around the refractory die cool first, while the large mass of powder above remains hot and supplies feed material to the low mass portion. This method reduces shrinkage in critical dimensionally sensitive areas around the refractory die. The refractory die may further contain thermally conductive materials such as silicon carbide or aluminum nitride to facilitate the heat transfer to the water-cooled lower ram.

The upper and lower rams can be made to move independently of one another, allowing added control when consolidating the particulate material to improve part density and dimensional accuracy in the finished product.

The forging die 3 may be made of graphite or other suitable material to withstand the heat and/or pressure necessary to consolidate the particulate materials.

The refractory die is formulated to give multiple physical and chemical properties and improvements with respect to particle packing density, dimensional expansion and control, and infiltration, to improve strength and chemical compatibility between refractory die materials, powder metal and chemical leachants.

The refractory die is made of coarse and fine ceramic particles. Particle sizes are graduated from 6 mesh through −325 mesh in specific portions to obtain a particle packing density of, for example, over 90 percent. Liquids, rheology agents, and binders are added to the ceramic powders, and vibration (discussed below) is utilized to produce a castable mix that replicates the original article. This method of producing a refractory die is superior to other casting or forming methods in regard to particle packing density, strength, dimensional accuracy and economy.

For example, a refractory die was made by mixing, in weight %, 43% SiC 16–35 mesh, 25% Si 35–80 mesh, 5% Si 80–325 mesh, 10% Si −325 mesh, 10% hydraulic setting alumina binder, 5% SiC −325 mesh, and 2% SiC fibers to form a mixture. Then, 0.1–0.2% defloculent/dispersant, 0.2–0.5% lignosulfonate, and 14–15% water are added to the mixture.

The refractory die materials are selected to be chemically compatible with the particular powder metal and consolidation temperatures used during the hot pressing process, as well as any chemical leachants used to extract the refractory die after hot pressing.

Materials of the refractory die also include, in whole or in part, titanium diboride, tungsten carbide, chromium carbide, silicon carbide, graphite, silica, silicon, silicon nitride, nitrogen, zirconia, alumina, kyanite, aluminum nitride, yttria and zinc oxide.

Figure 4:
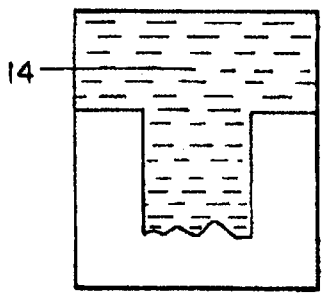
FIG. 4 is a cross-sectional view of a slurry of a refractory die mixture cast into layers.

FIG. 4 illustrates a particularly unique process for forming the refractory die according to the present invention. Here, layers of the slurry 14 (refractory die mixture) described above are cast onto a mold in ⅛ inch thick layers, for example. The slurry has a fairly high water content, such as 14–15%, so that the slurry has good flow properties, whereby ceramic particles may easily flow into fine detailed portions of the mold. The mold is vibrated to enhance particle flow, while simultaneously removing excess water, such as by using an absorptive swab. However, other water removal techniques may be utilized, such as hot air drying. The resultant cast body has a water content (e.g., 4–8%) that is significantly lower than the original 14–15% water content, whereby, after drying and firing, the refractory die has reduced shrinkage, reduced porosity, increased strength and excellent dimensional accuracy. It is noted that the refractory die need not be fired to fully sinter the ceramic material. For example, the SiC-based body (composition noted above) need only be fired to about 2400–2700° F., while SiC generally needs to be sintered at about 3500° F. for full sintering. Further, the refractory die may be fired with or without the mold on which it was formed. For example, currently available computer generated rapid prototype molds can be made from a resin material that may be burned out.

Unlike prior art techniques, the present technique actively removes excess water during vibration. Accordingly, a relatively high initial water content may be used to get superior detail in the refractory body, without suffering from excess shrinkage due to drying of the high water content body. For example, according to the present invention, it has been found that the refractory body shrinks only abut ½% during drying and firing. On the other hand, prior art refractory bodies formed by conventional casting techniques shrink considerably greater, such as 1.0–1.5% or more. Ceramic bodies formed by conventional slip casting may even shrink up to 17% after firing to full density.

Shrinkage of the refractory die may be even further reduced according to the present invention. The composition mixture of the refractory die may further include kyanite. Kyanite is a material that has a unique ability to expand permanently when heated. The refractory die composition with kyanite is heated to the desired expansion dimension giving an advantage of not only compensating for shrinkage that occurs during consolidation, but also shrinkage due to materials used in molds and dies.

Further, it has been found that evaporation of liquid binders and sintering at elevated temperatures to produce physical expansion can leave porosity in the refractory die. This porosity or void content can allow the refractory die to further densify or deform when applying heat and pressure when consolidating metal powders to high density. This shrinkage can result in a powder metal article with poor dimensional accuracy and surface finish. Such problems can be overcome by producing a refractory die by the above method and using an additional step of melt infiltrating the refractory die with molten materials in contact with the refractory die, whereby by capillary action, the molten material will infiltrate the refractory die to fill residual porosity. This additional step of infiltration has the added advantage to further densify the refractory die without the shrinkage and/or deformation that normally occurs when sintering or firing a refractory die to high density. These improvements translate into improved dimensional accuracy and surface finish of the finished article. By way of example, molten silicon may be used to infiltrate a porous SiC body.

While preferred embodiments of the present invention have been described above in detail, it is understood that those of ordinary skill in the art can make modifications to the present invention and still be within the scope of the appended claims.

I claim:

1. A method of forming a refractory die for forming a consolidated powder metallurgical body, comprising the steps of:

forming a slurry comprising ceramic particles in a liquid medium;

casting said slurry onto a mold having a molding surface containing surface details, said slurry having a liquid medium content sufficient to permit flow of the ceramic particles into the surface details of the mold;

simultaneously vibrating the mold and actively removing excess liquid medium from an exposed surface of the slurry, wherein the ceramic particles continue to flow into the surface details of the mold;

drying the slurry to form a dried green body; and firing the dried green body to form the refractory die.

2. The method of claim 1, wherein said liquid medium comprises water.

3. The method of claim 1, wherein said ceramic particles comprise SiC.

4. The method of claim 3, wherein said ceramic particles further comprise kyanite.

5. The method of claim 1, wherein said refractory die is fired at a temperature less than the sintering temperature of the ceramic particles required for full density firing.

6. The method of claim 1, wherein said slurry is dried in the mold, and the mold is removed before firing.

7. The method of claim 1, wherein the slurry is dried in the mold, and the mold is fired with the dried green body.

8. The method of claim 1, wherein the excess liquid medium is removed from the exposed surface of the slurry by wicking.

9. The method of claim 1, wherein the excess liquid medium is removed from the exposed surface of the slurry by hot air drying.

10. The method of claim 1, wherein the slurry is cast into the mold through an open end thereof, and the exposed surface of the slurry is defined, at least in part, by the open end of the mold.

11. A method of forming a refractory die for forming a consolidated powder metallurgical body, comprising the steps of:

(a) forming a slurry comprising ceramic particles in a liquid medium;

(b) casting a first layer of said slurry onto a mold having a molding surface containing surface details, said slurry having a liquid medium content sufficient to permit flow of the ceramic particles into the surface details of the mold;

(c) simultaneously vibrating the mold and actively removing excess liquid medium from the first layer of slurry, wherein the ceramic particles continue to flow into the surface details of the mold;

(d) casting an additional layer of said slurry onto said first layer of slurry;

(e) simultaneously vibrating the mold and removing excess liquid medium from the additional layer of slurry;

(f) drying the layers of slurry to form a dried green body; and (g) firing the dried green body to form the refractory die.

12. The method of claim 11, wherein steps (d) and (e) are repeated to form a plurality of slurry layers.

13. The method of claim 11, wherein the excess liquid medium is actively removed from an exposed surface of the slurry.

14. The method of claim 13, wherein the excess liquid medium is removed from the exposed surface of the slurry by wicking.

15. The method of claim 13, wherein the excess liquid medium is removed from the exposed surface of the slurry by hot air drying.

16. The method of claim 13, wherein the slurry is cast into the mold through an open end thereof, and the exposed surface of the slurry is defined, at least in part, by the open end of the mold.

17. The method of claim 12, wherein said ceramic particles comprise kyanite.

18. The method of claim 12, wherein said refractory die is fired at a temperature less than the sintering temperature of the ceramic particles required for full density firing.

* * * * *